United States Patent

Bermes

[11] Patent Number: 6,036,760
[45] Date of Patent: Mar. 14, 2000

[54] USE OF AQUEOUS LIQUID DYE CONCENTRATES COMPRISING A DISAZO DYE IN THE INKJET PROCESS AND ALSO DISAZO DYES

[75] Inventor: Rudolf Bermes, Ludwigshafen, Germany

[73] Assignee: BASF Aktiengesellschaft, Ludwigshafen, Germany

[21] Appl. No.: 08/962,492

[22] Filed: Oct. 31, 1997

[30] Foreign Application Priority Data

Nov. 7, 1996 [DE] Germany .......................... 196 45 775

[51] Int. Cl.[7] ...................................................... C09D 11/02
[52] U.S. Cl. ......................................... 106/31.52; 534/689
[58] Field of Search ........................... 106/31.52; 534/689

[56] References Cited

U.S. PATENT DOCUMENTS

| | | | |
|---|---|---|---|
| 2,489,463 | 11/1949 | Reynolds | 106/31.52 |
| 2,490,703 | 12/1949 | Paige | 260/187 |
| 4,118,182 | 10/1978 | Smith | 8/7 |
| 4,617,381 | 10/1986 | Hinson et al. | |
| 4,804,387 | 2/1989 | Degen et al. | 8/641 |
| 5,183,502 | 2/1993 | Meichsner et al. | 106/31.52 |
| 5,203,876 | 4/1993 | Kaser | 8/527 |
| 5,431,723 | 7/1995 | Bermes et al. | 106/31.52 |

FOREIGN PATENT DOCUMENTS

| | | |
|---|---|---|
| 13750 | 8/1980 | European Pat. Off. . |
| A-35152 | 9/1981 | European Pat. Off. . |
| 270003 | 6/1988 | European Pat. Off. . |
| 585659 | 3/1994 | European Pat. Off. . |
| A-2164348 | 3/1986 | United Kingdom . |

*Primary Examiner*—Helene Klemanski
*Attorney, Agent, or Firm*—John H. Shurtleff

[57] ABSTRACT

Aqueous liquid dye concentrates comprising, based on the weight of the concentrate, from 15 to 35% by weight of a dye quantity, from 90 to 100% by weight of the dye quantity consisting of the dye of the formula

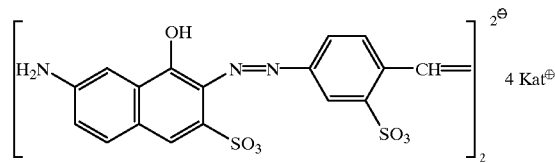

where Kat⊕ is the equivalent of a tertiary alkylalkanolammonium cation, are useful in the inkjet process.

8 Claims, No Drawings

USE OF AQUEOUS LIQUID DYE CONCENTRATES COMPRISING A DISAZO DYE IN THE INKJET PROCESS AND ALSO DISAZO DYES

DESCRIPTION

The present invention relates to the use of aqueous liquid dye concentrates comprising, based on the weight of the concentrate, from 15 to 35% by weight of a dye quantity, from 90 to 100% by weight of the dye quantity consisting of the dye of the formula I

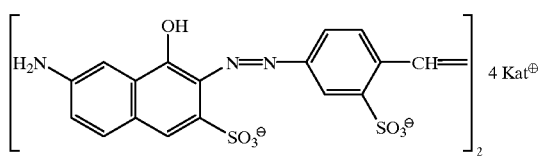

where Kat⊕ is the equivalent of a tertiary alkylalkanolammonium cation, in the inkjet process, and also to disazo dyes of the formula I.

The inkjet process is known per se. It involves droplets of a writing fluid (ink) being directed in a specific manner from one or more small nozzles onto a substrate, for example onto paper, wood, textiles, plastic or metal. Electronic control combines the individual droplets to form script characters or graphic patterns.

U.S. Pat. No. 4,118,182 discloses aqueous dye solutions which, as well as the dye anion conforming to the above formula, whose diazo component is 4,4'-diaminostilbene-2, 2'-disulfonic acid (flavonic acid) and whose coupling component is 1-hydroxy-7-aminonaphthalene-3-sulfonic acid (γ-acid), additionally comprise a dye having an identical diazo component but 1-hydroxy-8-aminonaphthalene-3,6-disulfonic acid (H-acid) as coupling component. Since the synthesis in the cited reference takes the form of mixed coupling, the dye solution comprises a third dye, having both γ-acid and H-acid as coupling component.

EP-A-13 750 and EP-A-270 003 describe as-synthesized solutions containing the dye of the formula I with other cations.

The aqueous reaction solution described in EP-A-13 750 has a high foreign salt content and is reacted with a further diazonium salt to form a polyazo dye.

The reaction solution described in EP-A-270 003 has to be subsequently admixed with a yellow dye to obtain a full liquid black.

EP-A 585 659 discloses that dyes of the general formula I where the cations are metal and ammonium cations can be used for the inkjet process. However, it has been found that dyes having metal cations (Na, Li, K) or else $NH_4^\oplus$ leave something to be desired in respect of the solubility in water and that even the triethanolammonium cation provides sufficiently stable concentrated dye solutions only with the inclusion of a cosolvent. An example of such a cosolvent is urea, which the market does not want, however.

It is an object of the present invention to provide liquid dye concentrates which shall be advantageously suitable for preparing inks for the inkjet process, by virtue of favorable application properties, especially good lightfastness, water resistance and ruboff resistance, and which shall make possible sufficiently high dye concentrations in water ideally without cosolvent.

We have found that this object is achieved by the dyes of the formula I defined at the beginning, in that we have found them to be advantageously suitable for preparing concentrates for the inkjet process.

To print a substrate, the concentrates are diluted to an ink.

As already observed above, the dye quantity in question consists essentially, i.e. to 90–100% by weight, preferably 95–100% by weight, based on the dye quantity, of the dye of the formula I.

The dye preparation may additionally include from 0 to 10% by weight, preferably from 0 to 5% by weight, based on the dye quantity, of one or more shading dyes, for example C.I. Acid Yellow 23 (19 140), C.I. Acid Blue 9 (42 090), C.I. Direct Red 254, C.I. Direct Blue 86 (74 180), C.I. Reactive Red 24, C.I. Reactive Blue 49, C.I. Reactive Red 72 or the dye-acid of the reaction product of tetrazotized flavonic acid with 1-amino-8-hydroxynaphthalene-3,6-disulfonic acid or 2-hydroxy-3-methylbenzoic acid in a molar ratio of 1:2 in each case.

Tertiary alkylalkanolammonium cations Kat⊕ are derived for example from the amines methyl-, ethyl-, propyl- or butyldiethanolamine or dimethyl-, diethyl-, dipropyl- or dibutylethanolamine, of which, for example, diethylethanolamine and butyldiethanolamine are preferred.

A portion of the amines mentioned can also be replaced by other tertiary amines such as triethanolamine or triisopropanolamine.

The concentrates which can be used according to the invention have excellent low temperature stability and generally comprise from 15 to 35%, preferably from 20 to 30%, of dyes of the formula I, the rest being water and a small proportion of neopentylglycol, if the dye was prepared by diazotization with neopentylglycol dinitrite. An amount of the amines underlying the Kat⊕ will customarily also be present, since these amines are used in excess relative to the sulfonic acid groups of the dyes of the formula I. In general, the excess is within the range from 10 to 50%. The dye concentrates may of course be additionally admixed with a solvent, but there is actually no necessity for it. The inkjet inks are prepared by diluting the concentrates according to the recipes of the ink manufacturers.

The dye concentrates to be used according to the invention should be essentially free from foreign salts. For the purposes of the present invention, this means that they may additionally include minor amounts, for example from 0 to 10% by weight, preferably from 0 to 5% by weight, in particular <1% by weight, based on the weight of the preparation, of foreign salts.

Foreign salts in this context are to be understood in general as meaning those salts which are entrained in the course of the synthesis (azo coupling) of the dyes of the formula I.

The dye concentrates which can be used according to the invention can be obtained, for example, by diazotizing flavonic acid with nitrous esters and coupling the diazonium salt onto gamma acid in water in the presence of the amines underlying water in Kat⊕. The process is described in EP-A 270 003, for example.

It is also possible to use for the purpose of the invention a reaction solution which is virtually free from foreign salts, as obtained for example according to EP-A-270 003 by diazotizaton with nitrous esters, optionally after addition of further abovementioned substances.

The dyes of the formula I are a further part of the subject-matter of the present invention.

The inkjet inks produce prints having advantageous application properties, for example favorable water resistance, lightfastness and ruboff resistance properties.

The Examples which follow illustrate the invention.

Parts are parts by weight.

EXAMPLE 1

74.1 parts of 4,4'-diaminostilbene-2,2'-disulfonic acid and 300 parts of water were stirred at room temperature and admixed dropwise in the course of about two hours with 36 parts of 1,3-bis(nitrosyloxy)-2,2'-dimethylpropane. After three hours of stirring, the remaining nitrite excess was destroyed with small additions of sulfamic acid.

The suspension obtained was then added to a solution prepared from 300 parts of water, 95.7 parts of 1-hydroxy-7-aminonaphthalene-3-sulfonic acid and 140 parts of diethylethanolamine, at 20–30° C. over 30 minutes with thorough stirring. The diazotization vessel was rinsed out with 50 parts of water. Water was added to adjust the fully coupled batch to a total amount of 1250 parts. The result obtained in this way was a storable solution of the dye of the formula I, which did not crystallize even at −5° C.

Dye content: 21.4%

EXAMPLE 2

Example 1 was repeated, except that the coupling was carried out with only 47 parts of diethylethanolamine and 119 parts of triethanolamine, likewise affording a storable solution which remained stable on cooling down to close to the freezing point.

EXAMPLE 3

Example 1 was repeated, except that 193 parts of butyldiethanolamine were used for the coupling, affording a storable solution of the dye of the formula I, which did not crystallize even at −5° C.

Dye content: 24.3%

EXAMPLE 4

Example 3 was repeated, except that the coupling was carried out with only 65 parts of butyldiethanolamine and 119 parts of triethanolamine, likewise affording a storable solution which remained stable on cooling down to close to the freezing point.

I claim:

1. A process for the inkjet printing of a disazo dye onto any desired substrate which comprises applying to said substrate a liquid composition consisting essentially of water as the solvent in which there is dissolved at least one water soluble dye of the formula I

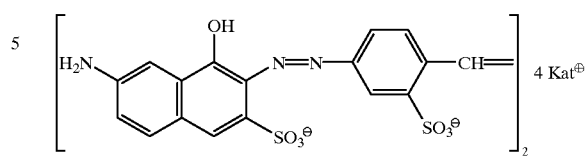

(I)

where Kat⊕ is the equivalent of a tertiary alkylalkanolammonium cation.

2. An aqueous liquid dye concentrate for use after dilution in the inkjet printing process as defined by claim 1, wherein the initial concentrate contains from 15 to 35% by weight of a dye quantity which, in its initially prepared form, has a content of from 90 to 100 % by weight of the dye of formula I, and is essentially free of foreign salts.

3. Dyes of the formula

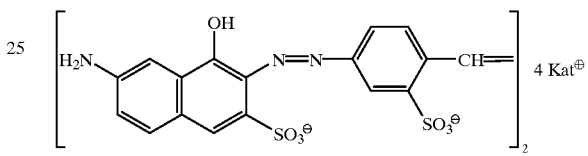

(I)

where Kat⊕ is a tertiary alkylalkanolammonium cation.

4. A dye as claimed in claim 3 wherein the tertiary alkylalkanolammonium cation is the diethylethanolammonium cation.

5. A dye as claimed in claim 3 wherein the tertiary alkylalkanolammonium cation is the butyldiethanolammonium cation.

6. An aqueous liquid dye concentrate as claimed in claim 2 wherein the initial aqueous concentrate, in its initially prepared form, contains from 20 to 30% by weight of said dye as defined by the formula I.

7. An aqueous liquid dye concentrate as claimed in claim 6 wherein the tertiary alkylalkanolammonium cation Kat⊕ of said formula I is selected from the group consisting of the methyl-, ethyl,- propyl- and butyl-diethanol amines.

8. An aqueous liquid dye concentrate as claimed in claim 6 wherein the tertiary alkylalkanolammonium cation Kat⊕ of the formula I is selected from the group consisting of the dimethyl-, diethyl-, dipropyl- and dibutyl-ethanol amines.

* * * * *